United States Patent [19]
Peterson et al.

[11] 3,751,652
[45] Aug. 7, 1973

[54] UNIVERSAL CAMERA FLASH SENSOR BRACKET

[75] Inventors: Dean M. Peterson, Littleton; Peter H. Neukirchner, Lakewood, both of Colo.

[73] Assignee: Honeywell Inc., Minneapolis, Minn.

[22] Filed: July 28, 1971

[21] Appl. No.: 166,860

[52] U.S. Cl. .................... 240/1.3, 95/10 CE, 95/86
[51] Int. Cl. ............................................ G03 15/02
[58] Field of Search .................. 240/1.3; 95/10 CE, 95/11 R, 11 L, 11.5 R, 86; 74/404, 416, 417

[56]  References Cited
UNITED STATES PATENTS

| | | | |
|---|---|---|---|
| 944,915 | 12/1909 | Sabbag | 74/417 X |
| 2,898,447 | 8/1959 | Hanlon | 240/1.3 |
| 3,353,465 | 11/1967 | Peterson et al. | 240/1.3 X |
| 2,644,381 | 7/1953 | Mendelsohn | 95/11.5 R |
| 3,614,918 | 10/1971 | Hennig et al. | 240/1.3 X |
| 2,721,929 | 10/1955 | Schwartz et al. | 240/1.3 |
| 1,060,597 | 5/1913 | Holzmark | 74/404 X |
| 2,972,673 | 2/1961 | Graef | 95/11.5 R X |

Primary Examiner—Fred L. Braun
Attorney—Arthur H. Swanson et al.

[57] ABSTRACT

A mounting bracket featuring a light sensing device is detachably securable to both a camera and a flash unit. A flash control signal is transmitted from the camera to the bracket through a first two wire electrical connection, and thence to the flash unit through a second two wire electrical connection, to effect the operation of the flash unit whereby to illuminate a scene being photographed. The second electrical connection is selectively extendable from, and ordinarily housed within, the bracket. A second signal representative of the operation of the flash unit is transmitted from the flash unit through the second electrical connection to a light sensing circuit, included within one embodiment of the mounting bracket, to activate a light sensing device which, in turn, monitors light received from the scene being photographed and generates a quench signal upon detection of a predetermined amount of the received light. The quench signal is transmitted to the flash unit through the second electrical connection for effectively terminating the illumination of the scene being photographed.

2 Claims, 5 Drawing Figures

INVENTORS
DEAN M. PETERSON
PETER H. NEUKIRCHNER
BY
*Lockwood D. Burton*

Patented Aug. 7, 1973

INVENTORS
DEAN M. PETERSON
PETER H. NEUKIRCHNER
BY
Lockwood D Burton

UNIVERSAL CAMERA FLASH SENSOR BRACKET

Subject matter disclosed but not claimed herein, is disclosed and claimed in a co-pending application of Francis T. Ogawa, Ser. No. 108,876, filed Jan. 22, 1971, now U.S. Pat. No. 3,714,443, and copending applications Ser. Nos. 262,018 and 262,019, both filed jointly by Dean M. Peterson and Peter T. Quinn on June 12, 1972.

The present invention relates generally to photographic apparatus and more particularly to an unique bracket means on which a camera means and a flash unit may be detachably mounted, and which features a light sensing means for use in computer-flash systems.

In prior art photographic systems, mounting brackets have been provided which are adapted to receive a camera means and a flash unit thereby furnishing a unitary picture taking combination. When indirect lighting is desired, the flash unit may be detached from the bracket. In some of those systems however, there is no provision for managing the multi-conductor cord connecting the flash unit with the camera unit. As a result, the combination is difficult to handle when taking a picture because of the long cable connecting the flash unit with the camera unit. Some flash units have been provided which include a housing for enclosing a coiled cord which electrically connects the flash unit with the camera. Those flash units inhere an additional disadvantage in that the flash unit necessarily becomes more bulky and hard to handle when a cord housing is included therein.

It is therefore an object of the present invention to provide a photographic system which obviates the disadvantages of the prior art systems.

It is another object of the present invention to provide an improved mounting bracket which is detachably connectable to a camera and a flash unit to form an easily manageable combination picture taking apparatus, and which includes means for housing a coiled cord electrically connecting the flash unit with the bracket and camera.

It is yet another object of the present invention to provide a bracket as set forth, with which a standard flash unit may be used, the flash unit being quickly detachable therefrom without releasing cumbersome electrical cables.

In computer type photographic systems, a flash unit is selectively operable to furnish illumination for a scene to be photographed. A light sensing means detects light received from that scene and generates a quench signal to terminate the illumination furnished by the flash unit. Generally, the light sensing means is affixed to either the camera or the flash unit. Each arrangement has distinct advantages. In the past however, with a given camera and flash unit, a photographer has not been able to selectively attach the light sensor to either the camera or flash unit whereby, selectively, to obtain the advantages of both arrangements.

It is therefore an object of the present invention to obviate the foregoing disadvantages of prior art computer-type photographic systems.

It is a further object of the present invention to provide a mounting bracket which is selectively attachable to either a camera or a flash unit of given photographic system, or both, and which includes therein a light sensing means.

It accomplishing these and other objects there has been provided, in accordance with the present invention a bracket means which is detachably securable to both a camera means and a flash unit to form a combination picture taking apparatus. The flash unit or the camera means may be detached from the bracket thereby permitting the bracket to remain mounted on the camera or the flash unit, respectively, while taking a picture. The bracket means includes means for housing and concealing a coiled cord which electrically interconnects the flash unit with the bracket and the camera. In one embodiment, the bracket features a light sensing means for use in a computer-flash photographic system.

A better understanding of the present invention may be had from the following detailed description when read in connection with the accompanying drawings in which.

Figure 1:
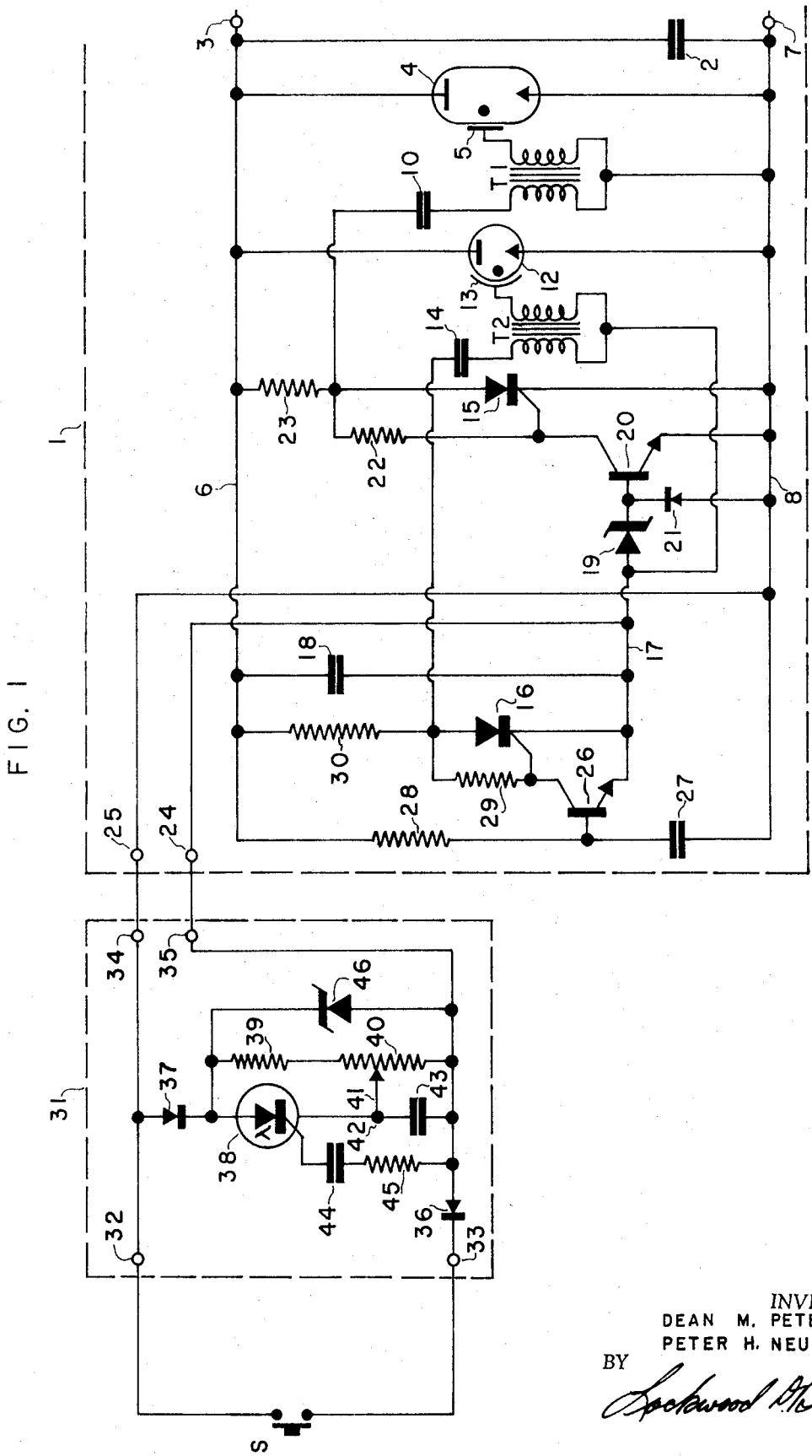
FIG. 1 is a schematic diagram of an exemplary circuit for use with the present invention.

Referring in more detail to FIG. 1, there is shown a flash circuit 1 which includes a capacitor 2, connected between two terminals 3 and 7. The two terminals 3 and 7 are connected to the usual capacitor charging means which are not shown in FIG. 1. Such capacitor charging means are well known in the art and it is sufficient to say that the capacitor 2 is normally maintained in the charged state by the aforementioned capacitor charging means whereby a relatively high voltage is maintained across the capacitor 2. The high voltage terminal 3 is connected to a bus 6; the terminal 7 is connected to a common bus 8. A light triggering terminal 5 of a flash tube 4 is coupled through a transformer T1 to one terminal of a capacitor 10. The other terminal of the capacitor 10 is connected to the anode terminal of a silicon controlled rectifier (SCR) 15. The common terminal of the transformer T1 is connected to the bus 8. A light terminating or quench tube 12 is shown connected between the bus 6 and the bus 8. A triggering terminal 13 is connected through a transformer T2 to one terminal of a capacitor 14. The other terminal of the capacitor 14 is connected to the anode terminal of a second SCR 16. The common terminal of the transformer T2 is connected to a bus 17.

The capacitor 18 connects the bus 6 with the bus 17. The bus 17 is connected to the anode of a zener diode 19. The cathode terminal of the zener diode 19 is connected to a common point between the base terminal of an NPN transistor 20 and the cathode terminal of a diode 21. The anode terminal of the diode 21 is connected to the common bus 8. The collector terminal of the transistor 20 is connected to a resistor 22 to the anode terminal of the SCR 15. The bus 6 is connected to the anode terminal of the SCR 15 through a resistor 23. The gate terminal of the SCR 15 is connected to the collector terminal of the transistor 20; the cathode terminal of the SCR 15 is connected to the common bus 8. The emitter terminal of the transistor 20 is also connected to the common bus 8. An input terminal 24 of the flash circuit 1 is connected to the bus 17, and the other input terminal 25 of the flash circuit 1 is connected to the common bus 8. The bus 17 is connected to the emitter terminal of an NPN transistor 26. The base terminal of the transistor 26 is connected through a capacitor 27 to a common bus 8. The base terminal of the transistor 26 is connected through a resistor 28 to the high voltage bus 6. The collector terminal of the transistor 26 is connected through two resistors 29 and 30 to the high voltage bus 6. The common point between the two resistors 29 and 30 is connected to the anode terminal of the SCR 16. The gate terminal of the SCR 16 is connected to the collector terminal of the transistor 26 and the cathode terminal of the SCR 16 is connected to the bus 17. A light sensing circuit 31 has a pair of first terminals 32 and 33. The input terminal 32 is connected directly to one terminal 34 of a pair of second terminals 34 and 35. The other input terminal 33 is connected through the cathode to anode path of a diode 36 to the other terminal 35 of the second terminals. The input terminals 32 and 33 may be connected externally to a shutter switch S of an associated camera. The input terminal 32 is connected through the anode to cathode path of a diode or gating means 37 to the anode terminal of a light responsive means or light activated silicon controlled rectifier (LASCR) 38.

The anode terminal of the LASCR 38 is also connected through two resistors 39 and 40 to the terminal 35 of the second terminals. The resistor 40 has a slider 41 connected to a junction point 42. The point 42 is connected to the cathode terminal of the LASCR 38 and also through a capacitor 43 to the terminal 35.

The gate terminal of the LASCR 38 is connected through the series connection of a capacitor 44 and a resistor 45 to the terminal 35. The anode terminal of a zener diode 46 is connected to the terminal 35 and its cathode terminal is connected to the anode terminal of the LASCR 38. The second terminal 34 and 35 of the light sensing circuit 31 are connected to input terminals 24 and 25 of the flash circuit 1.

In operation the capacitor 10 of the flash circuit 1 is charged from the high voltage bus 6 through the resistor 23. The capacitor 14 of the flash circuit 1 is similarly charged from the high voltage bus 6 through the resistor 30. The transistor 26 is so biased that it is ordinarily conducting in a steady state condition. The transistor 20 is similarly so biased that it is ordinarily conducting. With the transistor 26 conducting, the gate terminal of the SCR 16 is effectively clamped to its cathode terminal and is therefore nonconductive. Similarly, with the transistor 20 conducting, the gate terminal of the SCR 15 is effectively clamped to its cathode terminal thereby precluding conduction. When a switching means, for example the shutter switch S of an associated camera, provides a contact closure between the input terminals 32 and 33 of the light sensing circuit 31, a current flows from the bus 17 thru the diode 36 to the bus 8. At that time, the LASCR 38 will be disabled since the diode 37 is reversed biased. The voltage on the bus 17 decreases since a lower resistance path (diode 36) is present between the buses 17 and 8, than was present when the switch S was open (zener diode 19 and base emitter path of transistor 20). The lower voltage on the bus 17 with respect to the bus 8 will cause the transistor 20 to turn off. With the transistor 20 nonconducting, a current will flow through the resistor 22 and into the gate terminal of the SCR 15, thereby rendering it conductive. With the SCR 15 conducting, that relatively low resistance path rapidly discharges the capacitor 10, thereby triggering conduction through the flash tube 4. As the flash tube 4 begins to conduct, the voltage on the bus 6 is suddenly reduced as the charge on the capacitor 2 is dumped through the flash tube 4. The sudden voltage decrease of the high voltage decrease of the high voltage bus 6 is coupled through the capacitor 18 to the bus 17. That coupling action causing the voltage on the bus 17 to suddenly decrease to a negative value with respect to that voltage present on the bus 8. That relatively negative voltage level on the bus 17 is coupled to the light sensing circuit 31 through the terminals 24 and 25.

When the voltage at the output terminal 35 of the light sensing circuit 31 is positive with respect with the voltage appearing at the output terminal 34, the gating means for diode 37 will prevent conduction through the light sensing circuit since it is then reverse biased. However, as is now apparent, when the flash tube 4 begins to conduct, the voltage at the output terminal 34 of the light sensing circuit 31 becomes positive with respect to the voltage appearing at the output terminal 35, and the gating means or diode 37 will become forward biased and allow a current to flow therethrough. The diode 36 will be reverse biased thereby effectively disconnecting the switching means S from the light sensing circuit 31.

The current flowing through the diode 37, flows through the resistors 39 and 40. That current establishes a voltage at the anode of the LASCR 38 which effectively powers or enables the light responsive means or LASCR 38. The time interval between the activation of the switching means S connecting the input terminals 32 and 33 of the light sensing circuit 31, and the powering of the LASCR 38, is relatively short; therefore only momentary contact is required from the switching means S for the proper operation of the system. A portion of the current flowing through the resistor 39, flows through the slider 41 and begins to charge the capacitor 43. When the LASCR 38 is enabled, a sensor signal or current representative of the amount of light received thereby, flows through its gate terminal to the integrating capacitor 44 and the anticipation resistor 45. The function of the anticipation resistor 45 is fully explained in U.S. Pat. No. 3,519,879. When the voltage stored by the integrating capacitor 44 as biased by the anticipation resistor 45, exceeds the voltage representative of the charge stored on the dynamic anticipation capacitor 43, the LASCR 38 becomes conductive, thereby providing a low resistance path and an associated potential difference decrease between the output terminals 34 and 35, and consequently between the bus 17 and the bus 8. That potential difference decrease is coupled through the capacitor 27 to the base terminal of the transistor 26, thereby causing the transistor 26 to turn off. With the transistor 26 nonconducting, a current will flow into the gate terminal of the SCR 16 thereby rendering it conductive. When the SCR 16 becomes conductive, a lower resistance path is presented to the capacitor 14 of the flash circuit 1 causing the capacitor 14 to dump its charge therethrough. That action induces a triggering signal to appear at the quench tube triggering terminal 13, thereby initiating conduction in the quench tube 12. The rapid discharge of the capacitor 14 produces a ringing action to the circuit comprising the capacitor 14, the SCR 16, and the transformer T2. That ringing actions is effective to turn off the SCR after the quench tube triggering signal has been provided. The quench tube 12 has a much lower conducting resistance than the flash tube 4. After the quench tube 12 fires, the charge stored on the capacitor 2 of the flash unit 1 will rapidly dissipate to a point where the voltage on the bus 6 is insufficient to support ionization in either the quench tube 12 or the flash tube 4. Consequently, both tubes 12 and 4 will turn off. The charging circuit connected to the terminals 3 and 7 of the flash unit 1 will then begin to recharge the capacitor 2. The voltage appearing at the bus 6 will build up to a value sufficient to restore the biasing voltage required to turn the transistors 26 and 20 on, and the circuit shown in FIG. 1 will be returned to its "ready" condition to await the initiation of another cycle. The circuit just described is shown and claimed in the hereinbefore mentioned Ogawa application. While the circuit, per se, does not form a part of the present invention, the description thereof is included herein for the purpose of laying a proper environmental foundation for the structure of the present invention.

Figure 2:
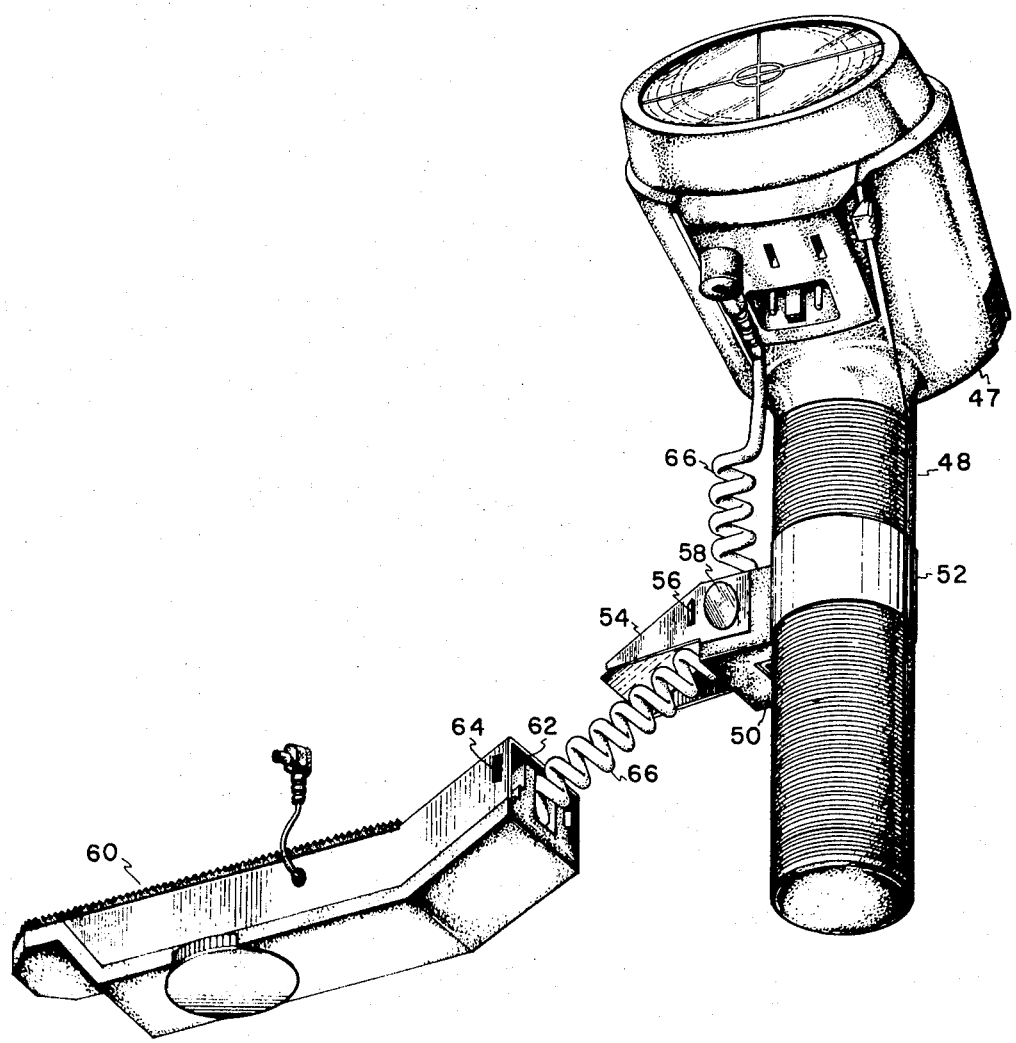
FIG. 2 is a perspective view of a flash device detached from the mounting bracket of the present invention.
Figure 3:
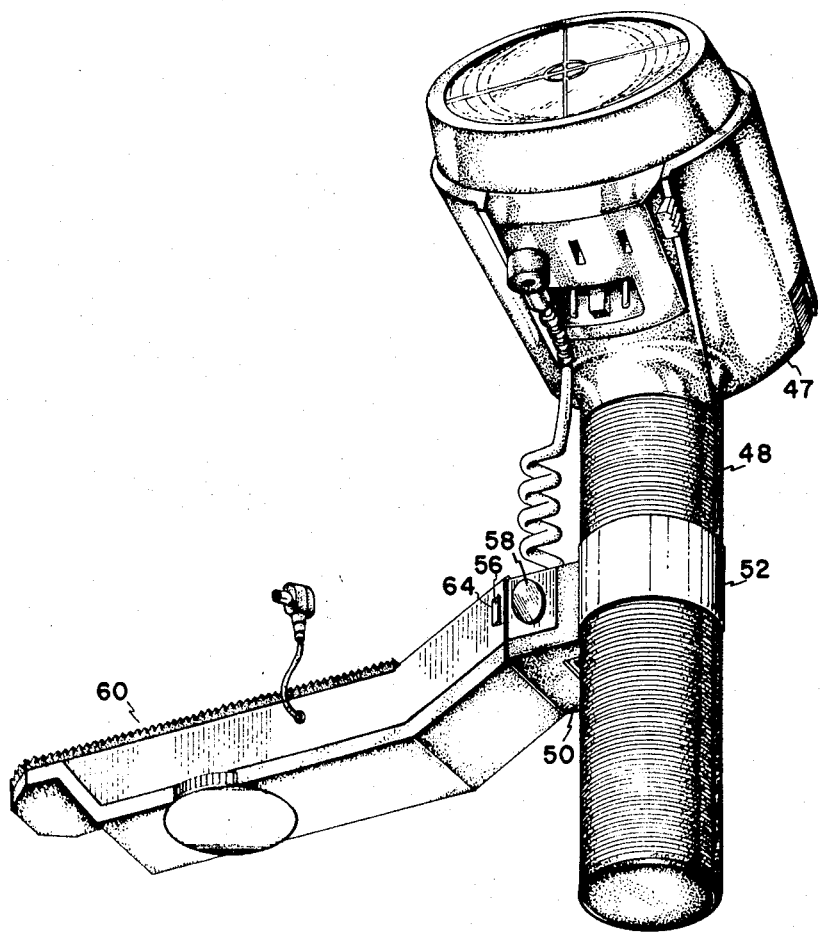
FIG. 3 is a perspective view of a flash device joined with the mounting bracket of the present invention.

FIG. 2 shows a flash device 47 including a handle 48. The handle 48 has a support 50 attached thereto by means of a cylindrical clip 52. The cylindrical clip 52 may be removed from the handle 48 by sliding the clip 52 down the handle 48. Secured to the support 50 is a male type connector 54. The connector 54 has retractable bosses 56 spring biased into a position protruding therefrom on both sides of the connector 54. A depressable button 58 is selectively operable for retracting the protruding bosses 56 from extending beyond the side portions of the connector 54. One end portion of a mounting bracket 60 defines a recess 62 for receiving a major portion of the male type connector 54. The bracket 60 also includes locking holes 64 for engaging the bosses 56. The flash unit 47 may be joined with the bracket 60 by depressing the buttons 58 whereupon the bosses 56 become depressed within the side walls of the connector 54. The connector 54 may then be inserted within the recess 62 of the bracket 60 until the bosses 56 are aligned with the lock holes 64 of the bracket 60. The button 58 may then be released, whereupon the bosses 56 are returned to their protruding position, extending into the lock holes 64 and locking the flash device 47 with the bracket 60 as shown in FIG. 3. It will be appreciated that the leading edges of the bosses 56 may be so bevelled that the mere engagement of those bosses with the side walls of the recess 62 cams the bosses into their depressed position until they are in alignment with the slots 64, whereupon they snap into locking engagement therewith. A coiled cord 66 provides an electrical connection between the bracket 60 and the flash device 47. The coiled cord 66 may be mechanically secured within the support 50 in order to limit the strain on that cord when the flash device 47 is detached from the bracket 60.

Figure 4:
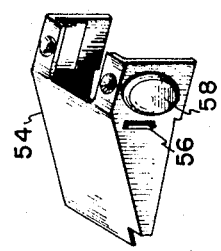
FIG. 4 is a perspective exploded view of a mounting bracket of the present invention featuring a light sensing means included therein.
Figure 4:
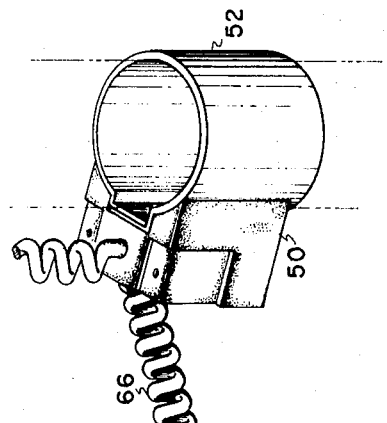
Figure 4:
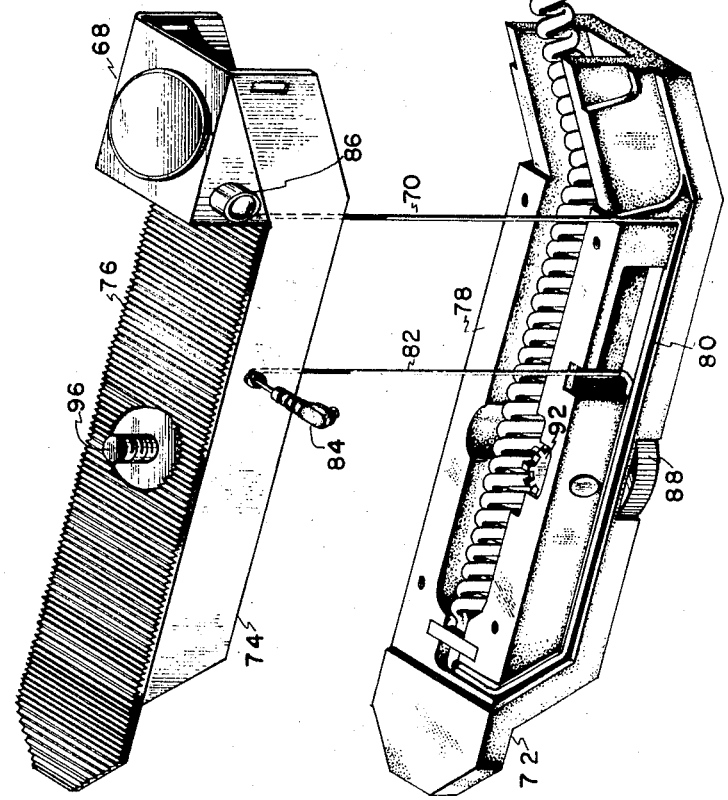

FIG. 4 shows an exploded perspective view of the bracket 60 featuring a light sensing means 68. In the present example the light sensing means 68 of FIG. 4 may include the light sensing circuit 31 of FIG. 1. The cable 70 may include the electrical conductors connected to the four terminals 32, 33, 34 and 35 of the light sensing circuit 31 which is included in the light sensing means 68.

Figure 5:
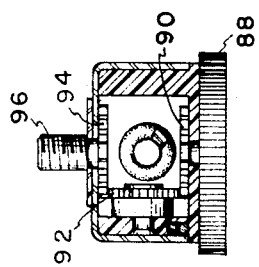
FIG. 5 is a cross section of the mounting bracket of FIG. 2.

The bracket 60 generally includes a base 72 and a cover 74. The cover 74 has affixed thereto a pad 76 for cushioning the base of an associated camera (not shown). The bracket base 72 includes a housing 78 which houses the coiled cord 66. The housing 78 has a wiring channel 80 within which the cable 70 is placed. The cable 70 runs within the wiring channel 80 from the light sensing means 68 to the end of the base 72 opposite the end which may be connected to the flash device 47. The cable 70 is then divided into the coiled cord 66 and a second cable 82. The coiled cord 66 extends through the housing 78 to the flash device 47, while the second cable 82 runs back through the wiring channel 80 and out through the bracket cover 74 to an electrical connector 84 which may be connected to an associated camera means which may be on the bracket 60 as by the threaded connector 96. The flash circuit 1 of FIG. 1 may be included in the flash device 47 of FIGS. 2 and 3, in which case the coiled cord 66 would correspond to the electrical connections between the terminals 34 and 35 of the sensing circuit 31 and the terminals 24 and 35 of the flash circuit 1 of FIG. 1. As hereinbefore mentioned, the light sensing circuit 31 of FIG. 1 may be included within the light sensing means 68 of FIG. 4, in which case the cable 82 would correspond to the electrical connections between the terminals 32 and 33 of the light sensing circuit 31, and the shutter switch "S" of an associated camera. Considering the light sensing circuit 31 to be included within the light sensing means 68, the LASCR 38 would receive light from a scene being photographed through a lens means 86 of the light sensing means 68. A thumbwheel 88 is connected to the threaded connection means 96 through a coupling means which is most clearly shown in FIG. 5. The coupling means of the present example includes three transition means as embodied in three engaging gear means 90, 92, and 94. The driving means or thumbwheel 88 is coupled to the first gear means 90. The first gear means 90 engages the second gear means 92 which is mounted in a plane perpendicular to that of the first gear means 90. The second gear means 92 engage the third gear means 94. The third gear means 94 lies in a plane which is perpendicular to the second gear means 92, and parallel to the first gear means 90. The third gear means is coupled to the threaded screw type connection means 96 which is, in turn, designed to engage with a compatible threaded tripod mounting recess common to most cameras. The walls of the housing 78 define a cavity as shown in FIG. 5 which is effectively avoided by the coupling means comprising the first, second, and third transition or gear means, thereby allowing the coiled cord 66 to extend therethrough. That is a desired feature since it allows extension of the coiled cable 66 without pulling the bracket 60 and an attached camera (not shown) to one side or the other of the line of sight to the scene being photographed as would be the case if the coiled cord 66 extended to one side or the other of the point of connection between the bracket 60 and a camera mounted thereon. The arrangement of the various gear means of FIG. 5 also provides for a maximum extension of the coiled cable 66 throughout the entire housing means 78.

With the threaded connection means 96 engaging the threaded tripod mounting recess of a camera means, and the connector 54 of the flash unit 47 secured and locked within the recess 62 of the bracket 60, a combination unit is provided which includes a camera, a sensing means, and a flash unit. Selectively, a photographer may detach the flash unit 47 from the bracket 60 in order to indirectly light a scene being photographed. In that case the sensing means is effectively mounted on the camera. The flash unit is readily reattached to the mounting bracket 60 and the coiled cord 66 is spring returned by its coiled arrangement within the housing 78 of the bracket 60. Similarly, the camera may be detached from the mounting bracket 60 in which case the light sensing means 68 would remain in physical proximity to the flash unit 47. Additionally, both the camera and the flash unit may be readily detached from the bracket 60, at the same time, thereby permitting film exposure, light sensing, and light furnishing operations to take place at different physical locations with respect to each other.

Thus, there has been provided a mounting bracket which may be readily attached to, or detached from, both a camera and a flash unit. The bracket features a light sensing means for computer flashed operation which requires only a two conductor connection to the flash unit. The bracket also includes a housing for a coiled cable which provides the two conductor electrical connection between the flash unit and the bracket and camera means. The bracket further includes a unique connection means whereby a connecting force may be transmitted through a hollow member without obstructing that member.

The embodiments of the invention of which an exclusive property or privilage is claimed are defined as follows:

1. A mounting bracket means for use in a photographic system wherein a flash unit is selectively actuable to furnish illumination for a scene to be photographed by an associated camera means, said mounting bracket means comprising:

a body member, said body member including means defining a recess within said body member;

an extendable coiled cord within said recess, said extendable coiled cord being secured near a first end thereof to one end of said body member, said coiled cord having a first terminal means at said first end thereof, said first terminal means being arranged for connection to said camera means;

first mechanical coupling means selectively operable for coupling said body member to said camera means independently of the connection providable through said first terminal means;

second mechanical coupling means including a support member;

a quick disconnect device connecting said body member and said second mechanical coupling means, said second mechanical coupling means being arranged to be attached to said flash unit, said coiled cord being secured near a second end thereof to said support member of said second mechanical coupling means, said coiled cord having a second terminal means at said second end thereof, said second terminal means being arranged for connection to said flash unit independently of the coupling provided through said second mechanical coupling means, said coiled cord providing the only electrical connection between said camera means and said flash unit, said quick disconnect device being selectively operable to disconnect said second mechanical coupling means from said body member for allowing said flash unit, with said second mechanical coupling means attached thereto, to be moved independently of said body member of said mounting bracket means by variably extending said coiled cord.

2. The mounting bracket means as set forth in claim 1 and further including a light sensing means mounted on said mounting bracket means, said light sensing means being electrically connected between said first and second terminal means, said light sensing means being operable to sense light received from said scene to be photographed and to generate a quench signal upon receipt of a predetermined amount of said light, said quench signal being applied to said second terminal means for transmission to said flash unit whereby to effectively terminate said illumination furnished by said flash unit.

* * * * *